(12) United States Patent
Yang (10) Patent No.: US 11,662,940 B2
(45) Date of Patent: May 30, 2023

(54) DATA STORAGE DEVICE AND DATA PROCESSING METHOD FOR RESTORING MLC/TLC MEMORY TO AVOID DEGRADATION OF ACCESS PERFORMANCE OF A MEMORY DEVICE CAUSED BY WORD LINE SHORT

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/079,503

(22) Filed: Oct. 25, 2020

(65) Prior Publication Data
US 2021/0278994 A1    Sep. 9, 2021

(30) Foreign Application Priority Data
Mar. 9, 2020    (TW) ................................. 109107586

(51) Int. Cl.
*G06F 3/00*     (2006.01)
*G06F 11/00*    (2006.01)
(Continued)

(52) U.S. Cl.
CPC .......... *G06F 3/0655* (2013.01); *G06F 3/0604* (2013.01); *G06F 3/065* (2013.01);
(Continued)

(58) Field of Classification Search
CPC ...... G06F 3/0655; G06F 3/065; G06F 3/0604; G06F 3/0679; G06F 3/0619;
(Continued)

(56) References Cited

U.S. PATENT DOCUMENTS 9,530,491 B1 * 12/2016 Uttarwar ............. G06F 12/0246
2012/0240012 A1    9/2012 Weathers
(Continued)

FOREIGN PATENT DOCUMENTS

| TW | 201327185 A1 | 7/2013 |
| TW | 201344432 A  | 11/2013 |
| TW | 201621912 A  | 6/2016 |

*Primary Examiner* — Reginald G Bragdon
*Assistant Examiner* — Michael L Westbrook
(74) *Attorney, Agent, or Firm* — Winston Hsu (57) ABSTRACT

A data storage device includes a memory device and a memory controller. The memory controller configures a first memory block which is a TLC memory blocks as a data buffer, and accordingly configures a plurality of second memory blocks which are SLC memory blocks. The memory controller uses the first memory block to receive data and accordingly store same data in the second memory blocks as backup data. When an amount of available memory space of the first memory block is smaller than or equal to a predetermined amount, the memory controller determines whether any error has occurred in the data stored in the first memory block. When there is any error occurred in the data stored in the first memory block, the memory controller configures a third memory block and move the backup data stored in the second memory block to the third memory block.

15 Claims, 5 Drawing Sheets

(51) Int. Cl.
*G06F 3/06* (2006.01)
*G06F 11/14* (2006.01)
*G06F 12/02* (2006.01)

(52) U.S. Cl.
CPC .......... *G06F 3/0619* (2013.01); *G06F 3/0679* (2013.01); *G06F 11/1448* (2013.01); *G06F 12/0253* (2013.01); *G06F 2201/805* (2013.01)

(58) Field of Classification Search
CPC ............. G06F 11/1448; G06F 11/1458; G06F 11/1461; G06F 11/2082; G06F 11/2056; G06F 2201/805; G06F 12/0253; G06F 2212/702; G06F 2212/7205
See application file for complete search history.

(56) References Cited

U.S. PATENT DOCUMENTS

| | | | |
|---|---|---|---|
| 2013/0055047 A1* | 2/2013 | Sharon | G06F 11/1068 714/764 |
| 2015/0012684 A1* | 1/2015 | Avila | G06F 3/065 711/103 |
| 2015/0286423 A1* | 10/2015 | Akirav | G06F 3/0689 711/103 |
| 2016/0211035 A1* | 7/2016 | Shapira | G06F 11/073 |
| 2017/0177236 A1 | 6/2017 | Haratsch | |
| 2020/0409805 A1* | 12/2020 | Kim | G06F 1/30 |

* cited by examiner

DATA STORAGE DEVICE AND DATA PROCESSING METHOD FOR RESTORING MLC/TLC MEMORY TO AVOID DEGRADATION OF ACCESS PERFORMANCE OF A MEMORY DEVICE CAUSED BY WORD LINE SHORT

BACKGROUND OF THE INVENTION

1. Field of the Invention

The invention relates to a data processing method capable of effectively solving the problem of data errors caused by short circuit of the word line and the associated data storage device utilizing the data processing method.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, effective control of access to these data storage devices is an important issue.

In the application of 3D NAND-type flash memory, the Triple-Level Cell (TLC) memory block may be utilized as the data buffer for receiving data from the host device and buffering the received data. However, short circuit of the word line (also called word line short) may occur during the operation of writing a TLC memory block. When the word line short occurs, the voltages stored in the memory cells corresponding to the spatially adjacent word lines will affect each other, causing voltage shift and leading to errors in bit data, and then generating the error bits. Once the error bits are generated, the memory controller has to perform some additional data recovery processing for the damaged data, thus degrading the access performance of the memory device.

In view of this, a data processing method for a data storage device and capable of solving the problem of data errors generated due to word line short is required.

SUMMARY OF THE INVENTION

As mentioned above, in the application of 3D NAND-type flash memory, the TLC memory block can be directly used as data buffer for receiving data from the host device and buffering the received data. However, the problem word line short may occur during the operation of writing a TLC memory block. When the word line short occurs, the voltages stored in the memory cells corresponding to the spatially adjacent word lines will affect each other, causing voltage shift and leading to errors in bit data, and then generating the error bits. Once the error bits are generated, the memory controller has to perform some additional data recovery processing for the damaged data, thus degrading the access performance of the memory device.

It is an objective of the invention to solve the problem of data errors generated due to word line short. In the embodiments of the invention, several memory blocks are additionally configured as the backup memory blocks of the data buffer. When an error has occurred in the data of the data buffer, the backup data stored in the SLC memory blocks can be used to replace the error data. Compared to the conventional design in which only the TLC memory block is used as the data buffer, once an error bit is generated, the memory controller needs to perform additional data recovery or repairing processing for the damaged data, which severely degrades the access efficiency of the memory device. By applying the proposed data processing method, degradation of the access performance of the memory device due to the execution of data recovery can be effectively avoided.

According to an embodiment of the invention, a data storage device comprises a memory device and a memory controller. The memory device comprises a plurality of memory blocks. The memory controller is coupled to the memory device and arranged to access the memory device. The memory controller is further arranged to configure a first memory block as a data buffer to receive data from a host device, and accordingly configure a plurality of second memory blocks. The first memory block is a Triple-Level Cell (TLC) memory block and the second memory blocks are Single-Level Cell (SLC) memory blocks. The memory controller is further arranged to use the first memory block to receive the data and accordingly store same data in the second memory blocks as backup data of the data stored in the first memory block. When an amount of available memory space of the first memory block is smaller than or equal to a predetermined amount, the memory controller is arranged to determine whether any error has occurred in the data stored in the first memory block. When there is any error occurred in the data stored in the first memory block, the memory controller is further arranged to configure a third memory block and move the backup data stored in the second memory blocks to the third memory block.

According to another embodiment of the invention, a data processing method for a data storage device comprising a memory device having a plurality of memory blocks and a memory controller coupled to the memory device and arranged to access the memory device comprises: configuring a first memory block as a data buffer to receive data from a host device; configuring a plurality of second memory blocks as backup memory blocks corresponding to the first memory block, wherein the first memory block is a Triple-Level Cell (TLC) memory block and the second memory blocks are Single-Level Cell (SLC) memory blocks; using the first memory block to receive the data and accordingly storing same data in the second memory blocks as backup data of the data stored in the first memory block; when an amount of available memory space of the first memory block is smaller than or equal to a predetermined amount, determining whether any error has occurred in the data stored in the first memory block; configuring a third memory block when determining that there is any error occurred in the data stored in the first memory block; and moving the backup data stored in the second memory blocks to the third memory block.

Compared to the conventional design in which only the TLC memory block is used as the data buffer, the proposed data processing method can effectively avoid degradation of the access performance of the memory device due to the execution of data recovery. In addition, compared to the conventional design in which only the SLC memory block is used as the data buffer, in the embodiments of the invention, when no error occurred in the data of the data buffer, the time of reading data from the SLC memory blocks can be saved.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the present invention. However, one of skilled in the art will understand how to implement the present invention in the absence of one or more specific details, or relying on other methods, elements or materials. In other instances, well-known structures, materials or operations are not shown or described in detail in order to avoid obscuring the main concepts of the present invention.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
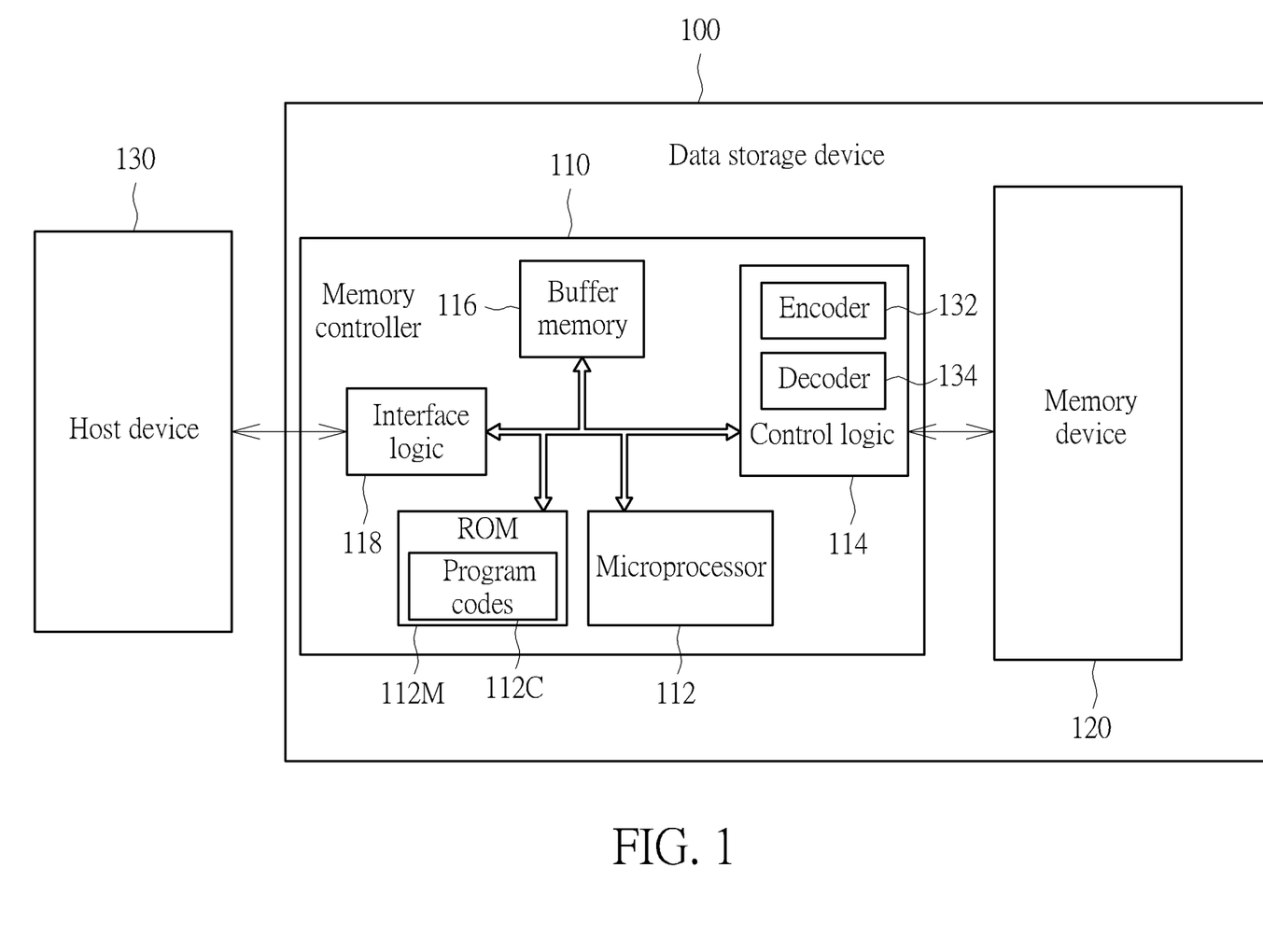
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, that is, the physical pages, and the access unit of a write operation performed by the controller (e.g., the memory controller 110, through the execution of the program codes 112C by the microprocessor 112) on the memory device 120 may be one page.

In practice, the memory controller 110 may perform various control operations using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. In an embodiment of the invention, the memory controller 110 may use the interface logic 118 to communicate with a host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the MMC interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data.

Generally, the memory device 120 may be divided into three regions, comprising a system region, a data region and a spare region. The memory controller 110 is configured to select a memory block from the spare region as a cache memory, or called a data buffer, to receive data and buffer the data. When the memory block (that is, the data buffer) is full (that is, has been fully or substantially fully written with data), the memory controller may further update the memory block currently being utilized as a data buffer as a data block in the data region. For example, when the memory block currently being utilized as a data buffer to receive data is an MLC or a TLC memory block and when the memory block is full, the memory block may be directly updated as a data block in the data region. When the memory block currently being utilized as a data buffer to receive data is an SLC memory block, when a predetermined number of such memory blocks are full, the memory controller may perform a garbage collection procedure to move the data stored in the memory blocks to an MLC or a TLC memory block (the destination memory block) and update the destination memory block as a data block in the data region.

According to an embodiment of the invention, the memory device 120 may be a 3D NAND-type flash memory, and the memory controller 110 may configure a first memory block as the aforementioned data buffer to receive data from the host device 130, wherein the first memory block is a TLC memory block. That is, when the host device 130 writes data to the memory device 120, the memory controller 110 may buffer the received data in the first memory block. When the first memory block is full, the memory controller 110 may directly update the first memory block as a data block in the data region. However, as discussed above, the word line short problem may occur during the operation of writing a TLC memory block. To avoid degradation of the access performance of the memory device due to the occurrence of word line short, the memory controller 110 may accordingly configure a plurality of second memory blocks as backup memory blocks corresponding to the first memory block when configuring the first memory block as the data buffer. According to an embodiment of the invention, the second memory block may be the SLC memory blocks and the data stored in the second memory blocks are the same as the data stored in the first memory block for the purpose of directing using the data stored in the second memory blocks to replace the data stored in the first memory block when determining or detecting that there is any error occurred in the data stored in the first memory block. In this manner, the memory controller 110 does not have to perform any additional data recovery processing for the damaged data and degradation of the access performance of the memory device can be avoided.

Figure 2:
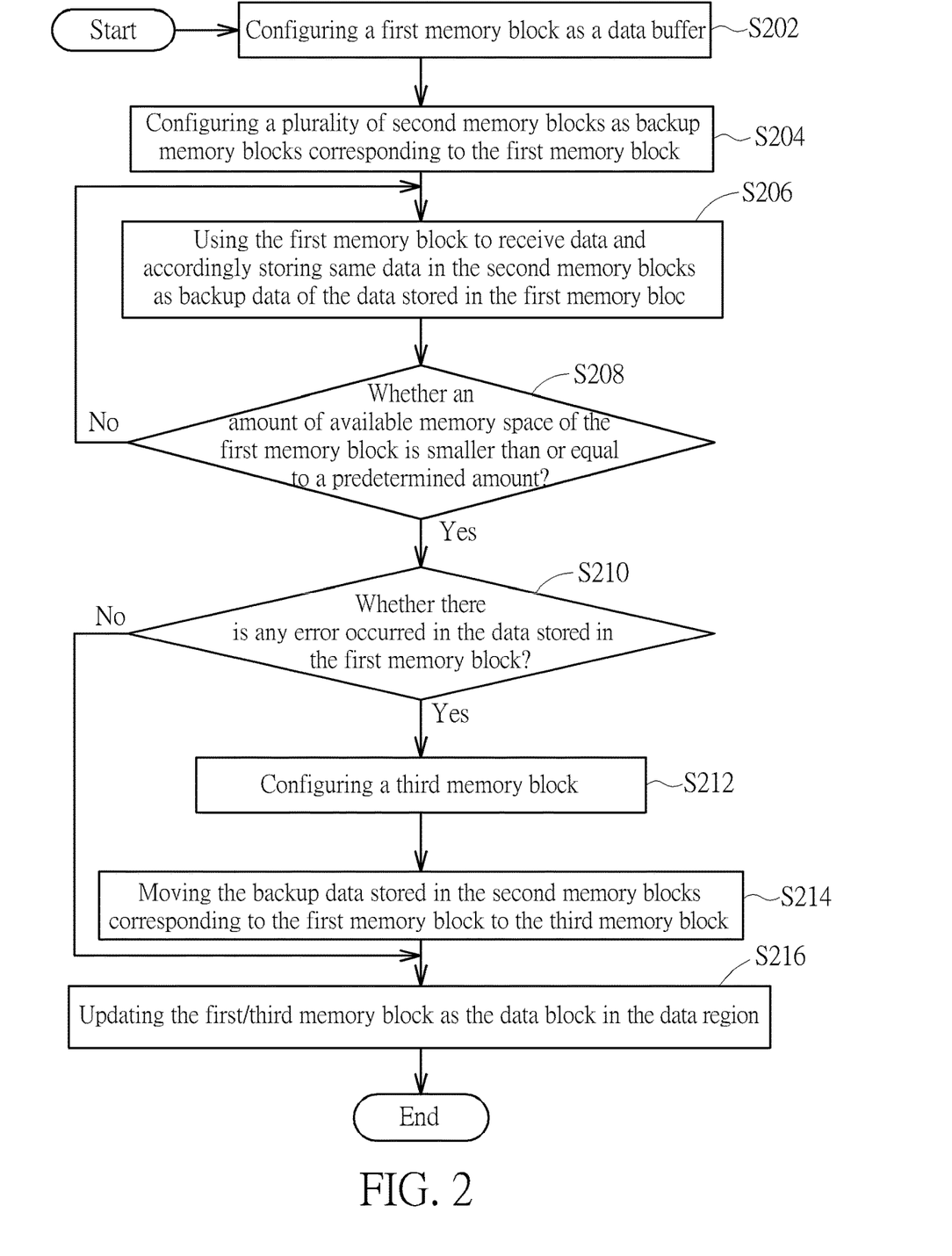
FIG. 2 is an exemplary flow chart of a data processing method according to an embodiment of the invention.

FIG. 2 is an exemplary flow chart of a data processing method according to an embodiment of the invention. The data processing method may be performed by the memory controller 110 and may comprise the following steps:

Step S202: Configuring a first memory block as a data buffer to receive data from the host device 130.

Step S204: Configuring a plurality of second memory blocks as backup memory blocks corresponding to the first memory block. According to an embodiment of the invention, the first memory block is a TLC memory block and the second memory blocks are SLC memory blocks.

Step S206: Using the first memory block to receive data and accordingly storing same data in the second memory blocks as backup data of the data stored in the first memory block. It should be noted that in the embodiments of the invention, the memory controller 110 is not limited to write the data into the first memory block first or to write the data into the second memory blocks first. In addition, since a variety of different methods to write data into a TLC memory block and to write data into an SLC memory block have been developed in the recent technologies, and the data writing methods can also be flexibly designed based on the required system performance, the invention is not limited to any specific data writing method.

Step S208: Determining whether an amount of available memory space of the first memory block (or, the remaining free space in the first memory block) is smaller than or equal to a predetermined amount. Since the size of the first memory block is known, the memory controller 110 may determine whether an amount of available memory space of the first memory block is smaller than or equal to a predetermined amount according to the amount of data that has been written in the first memory block. When it is determined that the amount of available memory space of the first memory block is greater than the predetermined amount, step S206 is returned. When it is determined that the amount of available memory space of the first memory block is smaller than or equal to the predetermined amount, step S210 is performed.

According to an embodiment of the invention, the predetermined amount utilized in step S208 may be set to the size of the first memory block multiplied by a ratio. For example, the predetermined amount may be set to 10% of the size of the first memory block, 5% of the size of the first memory block, 3% of the size of the first memory block, or others. According to another embodiment of the invention, the predetermined amount utilized in step S208 may be set to 0. That is, in step S208, whether the first memory block is full may be determined. When the first memory block is not full, step S206 is returned. When the first memory block is full, step S210 is performed.

Step S210: Determining whether there is any error occurred in the data stored in the first memory block. According to an embodiment of the invention, the memory controller 110 may check the content of the data stored in the first memory block page by page, calculate the number of error bits and determine whether there is any error occurred in the data stored in the first memory block according to the number of error bits. When the number of error bits occurred in a page of the first memory block is not more than a bit error threshold, the decoder 134 may perform error correction on the error bits so as to correct the error, where the bit error threshold defines the number of correctable error bits that can be corrected by the decoder 134 by using the error correction code. When the number of error bits occurred in any page of the first memory block is more than the bit error threshold (that is, when any page of the first memory block is determined as an Uncorrectable Error Correction Code (UECC) page), the memory controller 110 may determine that some data error has occurred in the first memory block due to the word line short problem. When the memory controller 110 determines that there is any error occurred in the data stored in the first memory block, step S212 is performed. When the memory controller 110 determines that no error has occurred in the data stored in the first memory block, step S216 is performed.

It should be noted that the method of determining whether there is any error occurred in the data stored in the first memory block is not limited to the method of determining whether any page in the first memory block is determined as an UECC page. When implementing the invention, the method of determining whether there is any error occurred in the data stored in the first memory block may be flexibly adjusted according to the system requirement or the software/hardware error recovery capability of the system.

Step S212: Configuring a third memory block. According to an embodiment of the invention, the third memory block is a TLC memory block. The memory controller 110 may select a memory block from the spare region as the third memory block as discussed above.

Step S214: Moving the backup data stored in the second memory blocks corresponding to the first memory block to the third memory block. According to an embodiment of the invention, when the memory controller 110 moves the backup data stored in the second memory blocks to the third memory block, the memory controller 110 may copy the backup data stored in the second memory blocks and store the copied backup data in the third memory block. For example, the memory controller 110 may read three pages of the backup data stored in the second memory block and store the read data into one page of the third memory block.

Step S216: Updating the first/third memory block as the data block in the data region. In this step, when the memory controller 110 determines that no error has occurred in the data stored in the first memory block, the memory controller 110 may directly update the first memory block as the data block in the data region. When the memory controller 110 determines that there is any error occurred in the data stored in the first memory block and thereby configuring the third memory block and moving the backup data stored in the second memory block to the third memory block, the memory controller 110 may directly update the third memory block as the data block in the data region after all the backup data stored in the second memory blocks has been moved to the third memory block.

According to an embodiment of the invention, when the memory controller 110 determines that there is any error occurred in the data stored in the first memory block in step S210, since the backup data stored in the second memory block is the backup of the data stored in the first memory block, the memory controller 110 may directly discard all the data stored in first memory block.

According to an embodiment of the invention, the aforementioned discarding of the data may be that the memory controller 110 no longer recognizes the data stored in the first memory block as valid data. For example, the memory controller 110 may perform some corresponding annotations or parameter settings, or the memory controller 110 may do no setting but just not using the first memory block. When the memory controller 110 has to configure a new memory block, the memory controller 110 may select the first memory block and perform an erase operation on the first memory block to erase the data stored in the first memory block, so as to release the available memory space.

Similarly, when the memory controller 110 determines that no error has occurred in the data stored in the first memory block in step S210, since the first memory block can be directly updated as a data block in the data region, the memory controller 110 may directly discard all the data stored in the second memory block.

As discussed above, the aforementioned discarding of the data may be that the memory controller 110 no longer recognizes the data stored in the second memory block as valid data. For example, the memory controller 110 may perform some corresponding annotations or parameter settings, or the memory controller 110 may do no setting but just not using the second memory block. When the memory controller 110 has to configure a new memory block, the memory controller 110 may perform an erase operation on the second memory block to erase the data stored in the second memory block, so as to release the available memory space.

According to an embodiment of the invention, when the memory controller 110 uses the first memory block as the data buffer to receive data from the host device 130, the memory controller 110 may at the same time maintain at least a first mapping table in the buffer memory 116. To be more specific, when using the first memory block to receive data, the memory controller 110 may accordingly record a plurality of logical addresses in the first mapping table. According to an embodiment of the invention, the first mapping table may be a Flash-to-Host (F2H) (which may also be named as Physical-to-Logical (P2L)) mapping table (that is, the current flash-to-host mapping table, since the first memory block is a current active memory block). The first mapping table may comprise a plurality of fields. One field records the corresponding mapping information of one physical page of the first memory block, and the corresponding mapping information is the physical-to-logical mapping information. That is, each field in the first mapping table records which logical page the data stored in the corresponding physical page of the first memory block is directed to (corresponding to). For example, the first mapping table may record the Logical Block Address (LBA) of a corresponding logical page, or may record the logical address of a logical page in other format.

It should be noted that, since the second memory block is configured as the backup memory block of the first memory block, the data stored in the second memory block is theoretically the same as the data stored in the first memory block, and has an one-to-one correspondence. Therefore, the memory controller 110 may maintain one F2H (or, P2L) mapping table (i.e. the aforementioned first mapping table) in the buffer memory 116 for one of the first memory block and the second memory blocks. As for the mapping information of the remaining memory block(s) that is not recorded in a mapping table, it can be directly derived from the mapping information recorded in the first mapping table.

Figure 3:
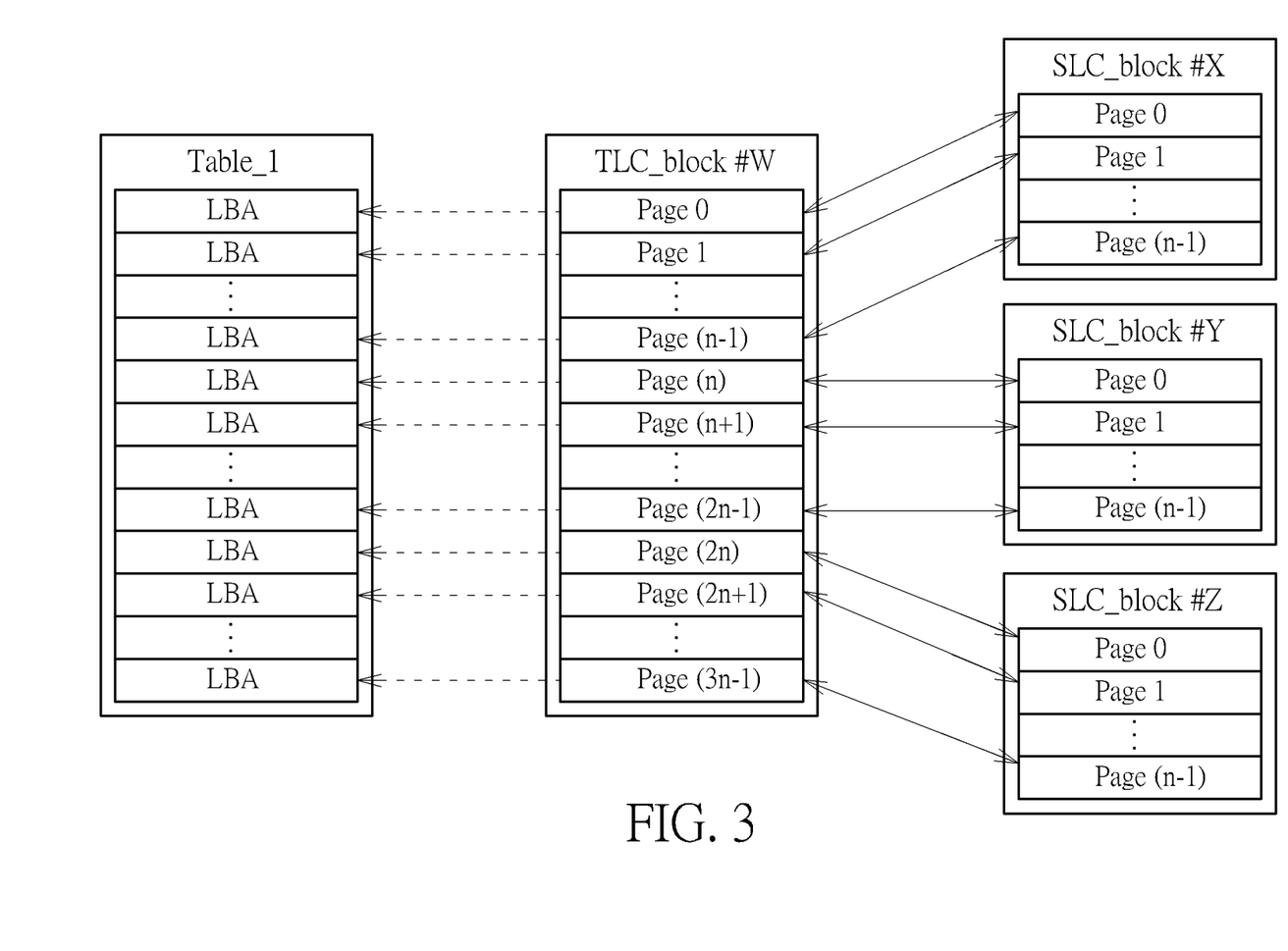
FIG. 3 shows exemplary content of the first mapping table according to an embodiment of the invention.

FIG. 3 shows exemplary content of the first mapping table according to an embodiment of the invention. FIG. 3 shows an example to illustrate how to derive the mapping information of the second memory blocks from the mapping information of the first memory block. As shown in FIG. 3, the first mapping table Table_1 records the mapping information of the first memory block TLC_Block whose memory block number is W (therefore, labeled as TLC-_Block #W). According to an embodiment of the invention, the first mapping table Table_1 may record a plurality of logical block addresses LBAs in the form of an array. A field in the array of the first mapping table corresponds to a physical page of the first memory block TLC_Block. That is, the value of the array index of the first mapping table Table_1 has a one-to-one mapping relationship with the index of the physical page (or, the physical page number) of the first memory block. For example, suppose that a starting array index of the first mapping table Table_1 is 0, the logical address recorded in the first field in the first mapping table Table_1, that is, the first record Table_1[0] of the first mapping table Table_1, is the address of the logical page that the data stored in the first physical page of the first memory block TLC_Block is directed to. Similarly, the logical address recorded in the second field in the first mapping table Table_1, that is, the second record Table 1[1] of the first mapping table Table_1, is the address of the logical page that the data stored in the second physical page of the first memory block TLC_Block is directed to, and so on.

When the memory controller 110 configuring the second memory blocks as the backup memory blocks of the first memory block, the memory controller 110 knows that the memory block numbers of the second memory blocks corresponding to the first memory block TLC_Block #W are the X, Y and Z (that is, the SLC_Block #X, SLC_Block #Y and SLC_Block #Z shown in FIG. 3). Therefore, the memory controller 110 is able to derive the mapping information of each physical page of the second memory blocks SLC_Block #X, SLC_Block #Y and SLC_Block #Z from the physical page numbers (e.g., the physical page numbers Page 0, Page 1 . . . Page (n−1), Page (n), Page (n+1) . . . Page (2n−1), Page (2n), Page (2n+1) . . . Page (3n−1) shown in FIG. 3) of the first memory block TLC_Block #W and the content of the first mapping table Table_1.

It should be noted that the invention is not limited to maintain one F2H (or, P2L) mapping table in the buffer memory 116. In other embodiments of the invention, the memory controller 110 may also maintain the corresponding F2H (or, P2L) mapping tables in the buffer memory 116 for both the first memory block and the second memory blocks at the same time.

According to different embodiments of the invention, the memory controller 110 may move the data (for example, steps S212~S214) in a foreground or background operation. According to a first embodiment of the invention, when it is designed to perform operations of data movement in the foreground, the memory controller 110 may directly move the backup data stored in the second memory blocks to the third memory block when detecting there is some error occurred in the data stored in the first memory block. According to a second embodiment of the invention, when it is designed to perform operations of data movement in the background, the memory controller 110 may keep the backup data stored in the second memory blocks until the memory device is idle (for example, when detecting that the host device 130 does not issue any access command to access the memory device over a predetermined time period), and move the backup data stored in the second memory blocks (e.g. the SLC memory blocks) to the third memory block (e.g. the TLC memory block) via a garbage collection procedure performed in the background.

Figure 4:
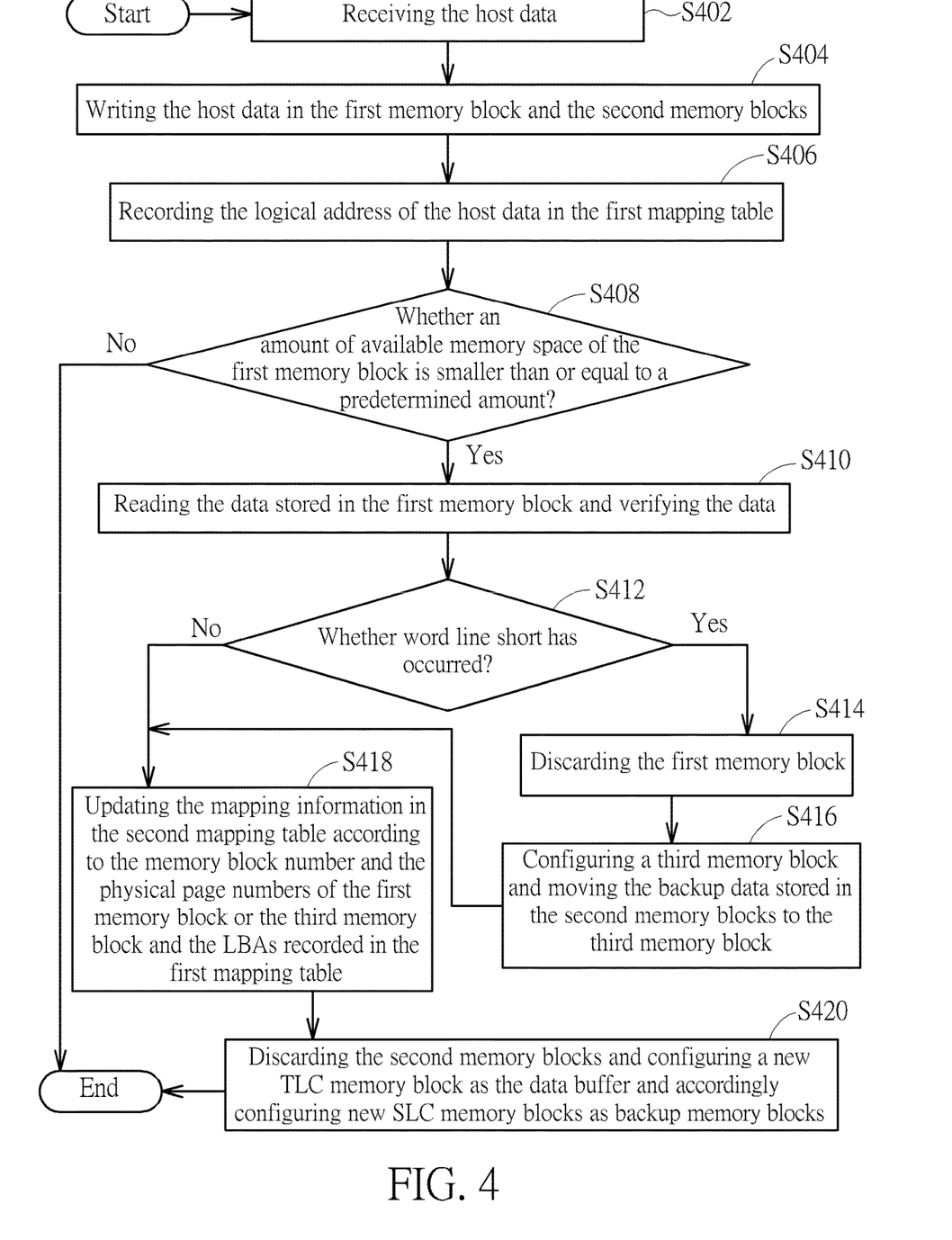
FIG. 4 is an exemplary flow chart of a data processing method according to another embodiment of the invention.

FIG. 4 is an exemplary flow chart of a data processing method according to another embodiment of the invention. The flow chart illustrates the operations of moving data in the foreground. According to the first embodiment of the invention, the flow may begin when the memory controller 110 receives a write request from the host device 130, and may comprise the following steps:

Step S402: Receiving the data that the host device wants to write (hereinafter called the host data).

Step S404: Writing the host data in the first memory block and the second memory blocks. As discussed above, the first memory block is a TLC memory block and the second memory blocks are SLC memory blocks.

Step S406: Recording the logical address of the host data in the first mapping table stored in the buffer memory 116. As discussed above, the first mapping table is an F2H (or, P2L) mapping table.

Step S408: Determining whether an amount of available memory space of the first memory block (or, the remaining free space in the first memory block) is smaller than or equal to a predetermined amount. Since the size of the first memory block is known, the memory controller 110 may determine whether an amount of available memory space of the first memory block is smaller than or equal to a predetermined amount according to the amount of data that has been written in the first memory block. When it is determined that the amount of available memory space of the first memory block is greater than the predetermined amount, the flow is ended and will be restarted when receiving another write request from the host device 130. When it is determined that the amount of available memory space of the first memory block is smaller than or equal to the predetermined amount, step S410 is performed.

As discussed above, according to an embodiment of the invention, the predetermined amount utilized in step S408 may be set to the size of the first memory block multiplied by a ratio. For example, the predetermined amount may be set to 10% of the size of the first memory block, 5% of the size of the first memory block, 3% of the size of the first memory block, or others. According to another embodiment of the invention, the predetermined amount utilized in step S408 may be set to 0. That is, in step S408, whether the first memory block is full may be determined. When the first memory block is not full, the flow is ended and will be restarted when receiving another write request from the host device 130. When the first memory block is full, step S410 is performed.

Step S410: Reading the data stored in the first memory block and verifying the data.

Step S412: Determining whether word line short has occurred in the first memory block (for example, determining whether there is any error occurred in the data stored in the first memory block). If yes, step S414 is performed. If no, step S418 is performed.

Step S414: Discarding the first memory block. As discussed above, the discarding of the data may be that the memory controller 110 no longer recognizes the data stored in the first memory block as valid data. For example, the memory controller 110 may perform some corresponding annotations or parameter settings, or the memory controller 110 may do no setting but just not using the first memory block. When the memory controller 110 has to configure a new memory block, the memory controller 110 may select the first memory block and erase the data stored in the first memory block, so as to release the available memory space. In the embodiments of the invention, since the mapping information of the first memory block recorded in the first mapping table will not be updated to the memory device 120 when the memory controller 110 decides to discard the first memory block, the linking (that is, the mapping information) of the data stored in the first memory block will not be recorded in the memory device 120. When the linking (the mapping information) of the data is not established or recorded in the memory device 120, or when the linking becomes an invalid linking, the data becomes invalid data.

Step S416: Configuring another new TLC memory block (for example, the third memory block) and moving the backup data stored in the second memory blocks to the third memory block.

Step S418: Updating the content of the first mapping table to the content of the second mapping table stored in the memory device 120 according to the memory block number and the physical page numbers of the first memory block or the third memory block and the LBAs recorded in the first mapping table. In this step, when the word line short has not occurred in the first memory block, the memory controller 110 updates the content of the first mapping table to a second mapping table stored in the memory device 120 according to the memory block number and the physical page numbers of the first memory block and the LBAs recorded in the first mapping table. When the word line short has occurred in the first memory block, the memory controller 110 updates the content of the first mapping table to a second mapping table stored in the memory device 120 according to the memory block number and the physical page numbers of the third memory block and the LBAs recorded in the first mapping table. In addition, the memory controller 110 may further update the first memory block or the third memory block as the data block in the data region before or after updating the mapping information recorded in the first mapping table to the second mapping table.

According to an embodiment of the invention, the second mapping table may be stored in the system region of the memory device 120. The second mapping table may be a Host-to-Flash (H2F) (which may also be named as Logical-to-Physical (L2P)) mapping table. The data recorded in the second mapping table corresponds to a plurality of logical pages. Generally, the number of fields comprised in the second mapping table is related to the number of logical pages comprised in the system of the host device 130, where one field of the second mapping table Table_2 corresponds to one logical page of the host device system, so as to record the mapping information of the corresponding logical page, where the corresponding mapping information is the logical-to-physical mapping information. That is, each field in the second mapping table records which memory block and which physical page the data of the corresponding logical page is directed to (the data of the corresponding logical page is physically stored in). According to an embodiment of the invention, the host device system may be a system comprising the host device 130 and the data storage device 100, or may be a system further comprising one or more peripheral devices coupled to the host device 130.

According to an embodiment of the invention, the second mapping table may record a memory block number and a page number that correspond to each logical page in the form of an array, so as to record which memory block and which physical page data of each logical page is directed to (physically stored in). As discussed above, one field of the second mapping table corresponds to one logical page. Therefore, the array index of the second mapping table has a one-to-one mapping relationship with the index of the logical page (or, the logical page number). For example, suppose that a starting array index of the second mapping table Table_2 is 0, the memory block number and the page number recorded in the first field of the second mapping table Table_2 (that is, the first record Table_2[0] of the second mapping table Table_2) is the physical memory block number and the physical page number that the data of the first logical page of the host device system is physically stored in, the memory block number and the page number recorded in the second field of the second mapping table Table_2, (that is, the second record Table_2[1] of the second mapping table Table_2) is the physical memory block number and the physical page number that the data of the second logical page of the host device system is physically stored in, and so on.

Since the data that the host device wants to write into the memory device has already been moved to the third memory block, the memory controller 110 may directly replace the memory block number of the first memory block by the memory block number of the third memory block in step S418 and record the memory block number and the physical page number of the third memory block in the corresponding field according to the LBAs recorded in the first mapping table.

Step S420: Discarding the second memory blocks and configuring a new TLC memory block as the data buffer and accordingly configuring new SLC memory blocks as the backup memory blocks after the mapping information of the first memory block or the third memory block has been written (updated) in the second mapping table (that is, the H2F or L2P mapping table) stored in the memory device 120 (for example, in step S418).

In the first embodiment of the invention, when determining that there is any error occurred in the data stored in the first memory block, the memory controller 110 may discard the first memory block (Step S414) (that is, the current F2H mapping table) and move the backup data stored in the second memory block to the third memory block (Step S416) before updating content of the second mapping table based on content of the first mapping table. Since the mapping information of the first memory block recorded in the first mapping table will not be updated to the memory device in step S418 when the memory controller 110 determines to discard the first memory block, the linking (that is, the mapping information) of the data stored in the first memory block will not be recorded in the memory device 120. When the linking (the mapping information) of the data is not established or recorded in the memory device 120, or when the linking becomes an invalid linking, the data becomes invalid data.

Figure 5:
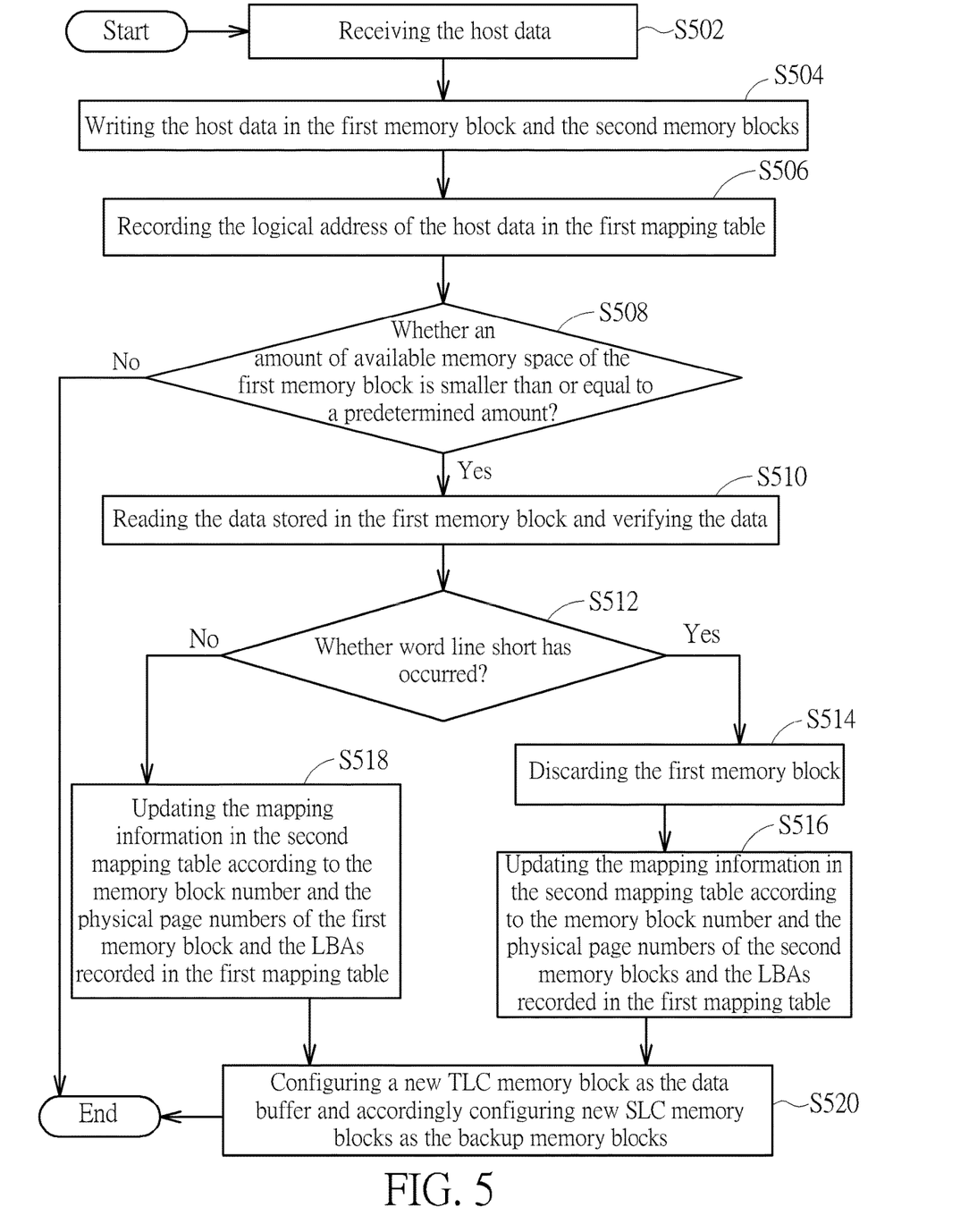
FIG. 5 is an exemplary flow chart of a data processing method according to yet another embodiment of the invention.

FIG. 5 is an exemplary flow chart of a data processing method according to yet another embodiment of the invention. The flow chart illustrates the operations of moving data in the background. According to the second embodiment of the invention, the flow may begin when the memory controller 110 receives a write request from the host device 130, and may comprise the following steps:

Step S502: Receiving the data that the host device wants to write into the memory device (hereinafter called the host data).

Step S504: Writing the host data in the first memory block and the second memory blocks. As discussed above, the first memory block is a TLC memory block and the second memory block are SLC memory blocks.

Step S506: Recording the logical address of the host data in the first mapping table stored in the buffer memory 116. As discussed above, the first mapping table is an F2H (or, P2L) mapping table.

Step S508: Determining whether an amount of available memory space of the first memory block (or, the remaining free space in the first memory block) is smaller than or equal to a predetermined amount. Since the size of the first memory block is known, the memory controller 110 may determine whether an amount of available memory space of the first memory block is smaller than or equal to a predetermined amount according to the amount of data that has been written in the first memory block. When it is determined that the amount of available memory space of the first memory block is greater than the predetermined amount, the flow is ended and will be restarted when receiving another write request from the host device 130. When it is determined that the amount of available memory space of the first memory block is smaller than or equal to the predetermined amount, step S510 is performed.

As discussed above, according to an embodiment of the invention, the predetermined amount utilized in step S508 may be set to the size of the first memory block multiplied by a ratio. For example, the predetermined amount may be set to 10% of the size of the first memory block, 5% of the size of the first memory block, 3% of the size of the first memory block, or others. According to another embodiment of the invention, the predetermined amount utilized in step S508 may be set to 0. That is, in step S508, whether the first memory block is full may be determined. When the first memory block is not full, the flow is ended and will be restarted when receiving another write request from the host device 130. When the first memory block is full, step S510 is performed.

Step S510: Reading the data stored in the first memory block and verifying the data.

Step S512: Determining whether word line short has occurred in the first memory block (for example, determining whether there is any error occurred in the data stored in the first memory block). If yes, step S514 is performed. If no, step S518 is performed.

Step S514: Discarding the first memory block. As discussed above, the discarding of the data may be that the memory controller 110 no longer recognizes the data stored in the first memory block as valid data. For example, the memory controller 110 may perform some corresponding annotations or parameter settings, or the memory controller 110 may do no setting but just not using the first memory block. When the memory controller 110 has to configure a new memory block, the memory controller 110 may select the first memory block and erase the data stored in the first memory block, so as to release the available memory space. In the embodiments of the invention, since the mapping information of the first memory block recorded in the first mapping table will not be updated to the memory device 120 when the memory controller 110 decides to discard the first memory block, the linking (that is, the mapping information) of the data stored in the first memory block will not be recorded in the memory device 120. When the linking (the mapping information) of the data is not established or recorded in the memory device 120, or when the linking becomes an invalid linking, the data becomes invalid data.

Step S516: Updating the content of the first mapping table to the second mapping table stored in the memory device 120 according to the memory block number and the physical page number of the second memory blocks and the LBAs recorded in the first mapping table.

As discussed above, in an embodiment of the invention, the second mapping table may be stored in the system region of the memory device 120. The second mapping table may be the H2F (or, L2P) mapping table. In an embodiment of the invention, when the memory controller 110 only maintain the F2H (or, P2L) mapping table (i.e. the aforementioned first mapping table) in the buffer memory 116 for the first memory block, the mapping information which is not recorded in the buffer memory 116 of the second memory blocks may be derived from the content recorded in the first mapping information in step S516 by using the one-to-one correspondence of the first memory block and the second memory blocks as shown in FIG. 3, and the memory controller 110 may further record the derived mapping information in the corresponding fields in the second mapping table. On the other hand, when the memory controller 110 maintains the F2H (or, P2L) mapping table (i.e. the aforementioned first mapping table) corresponding to the second memory blocks in the buffer memory 116, the memory controller 110 may directly record the memory block number and the physical page number of the second memory blocks in the corresponding fields in the second mapping table in step S516 according to the LBAs recorded in the first mapping table.

Step S518: Updating the content of the first mapping table to the second mapping table stored in the memory device 120 according to the memory block number and the physical page number of the first memory block and the LBAs recorded in the first mapping table. In this step, since the word line short has not occurred in the first memory block, the memory controller 110 does not have to discard the data stored in the first memory block, and may directly update the content of the second mapping table. In addition, the memory controller 110 may further update the first memory block as the data block in the data region before or after updating the mapping information recorded in the first mapping table to the second mapping table.

Step S520: Configuring a new TLC memory block as the data buffer and accordingly configuring new SLC memory blocks as the backup memory blocks.

Since the mapping information of the first memory block or the second memory blocks has been written (updated) in the second mapping table (that is, the H2F or L2P mapping table) stored in the memory device 120 (for example, in step S516 or S518), the memory controller 110 may configure a new TLC memory block as the data buffer and accordingly configure new SLC memory blocks as the backup memory blocks.

In the second embodiment of the invention, when determining that there is any error occurred in the data stored in the first memory block, the memory controller 110 may discard the first memory block (Step S514) before updating content of the second mapping table based on content of the first mapping table (that is, the current F2H mapping table). Since the mapping information of the first memory block recorded in the first mapping table will not be updated to the memory device in step S516 or S518 when the memory controller 110 determines to discard the first memory block, the linking (that is, the mapping information) of the data stored in the first memory block will not be recorded in the memory device 120. When the linking (the mapping information) of the data is not established or recorded in the memory device 120, or when the linking becomes an invalid linking, the data becomes invalid data.

In addition, in the second embodiment of the invention, since the memory controller 110 will not move the backup data stored in the second memory blocks to another memory block (for example, the third memory block) before updating the content of the second mapping table based on the content of the first mapping table, and will move the backup data stored in the second memory blocks to another memory block (for example, the third memory block) via a garbage collection procedure performed in background after updating the content of the second mapping table based on the content of the first mapping table (Step S516 or S518), the write operations of writing the host data can be further sped up.

As discussed above, in the embodiments of the invention, several memory blocks are additionally configured as the backup memory blocks of the data buffer. It is preferably to select the SLC memory blocks as the backup memory blocks. Since the SLC memory block has the properties of fast writing speed and low data error rate, the correctness of backup data is ensured. When an error has occurred in the data of the data buffer, the backup data stored in the SLC memory blocks can be used to replace the error data. When there is no error occurred in the data of the data buffer, the backup data stored in the SLC memory blocks can be directly discarded. In the conventional design in which only the TLC memory block is used as the data buffer, once an error bit is generated, the memory controller needs to perform additional data recovery or repairing processing for the damaged data, which severely degrades the access efficiency of the memory device. Therefore, compared with the conventional design, the proposed data processing method can effectively avoid degradation of the access performance of the memory device due to the execution of data recovery.

In addition, in the embodiments of the invention, the operations of writing host data may comprise writing the host data into the TLC memory block (the data buffer) and writing host data to the SLC memory blocks (as the backup data). When there is no error occurred in the data of the data buffer, the backup data stored in the SLC memory blocks can be directly discarded. Note that, in the conventional designs which only use the SLC memory block as the data buffer, in order to increase the amount of data storage, garbage collection must still be performed eventually. Therefore, the operations of writing host data in the conventional designs actually comprise writing the host data into the SLC memory block (the data buffer), and the operations of performing garbage collection comprise reading data from the SLC memory blocks and writing data to the TLC memory block. In this manner, compared with the conventional designs in which only the SLC memory block is used as the data buffer, in the embodiments of the invention, when no error occurred in the data of the data buffer, the time of reading data from the SLC memory blocks can be saved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
a memory device, comprising a plurality of memory blocks; and
a memory controller, coupled to the memory device and arranged to access the memory device, wherein the memory controller is further arranged to configure a first memory block as a data buffer to receive data from a host device, and accordingly configure a plurality of second memory blocks, the first memory block is a Triple-Level Cell (TLC) memory block and the second memory blocks are Single-Level Cell (SLC) memory blocks, and
wherein the memory controller is further arranged to use the first memory block to receive the data and accordingly store same data in the second memory blocks as backup data of the data stored in the first memory block, and the memory controller is arranged to maintain a current flash-to-host mapping table for only one of the first memory block and the second memory blocks in a buffer memory and mapping information of the other of the first memory block and the second memory blocks is not recorded in a mapping table, wherein the current flash-to-host mapping table comprises a plurality of fields, one field records physical-to-logical mapping information of one physical page of said one of the first memory block and the second memory blocks to indicate which logical page the data stored in said one physical page is directed to,
when the first memory block is full, the memory controller is arranged to determine whether any error has occurred in the data stored in the first memory block, and
when there is any error occurred in the data stored in the first memory block, the memory controller is further arranged to configure a third memory block and move the backup data stored in the second memory blocks to the third memory block.

2. The data storage device of claim 1, wherein when there is any error occurred in the data stored in the first memory block, the memory controller is further arranged to discard all the data stored in the first memory block.

3. The data storage device of claim 1, wherein the third memory block is a TLC memory block, when the memory controller moves the backup data stored in the second memory blocks to the third memory block, the memory controller is arranged to copy the backup data stored in the second memory blocks and store the copied backup data in the third memory block.

4. The data storage device of claim 3, wherein after the backup data stored in the second memory blocks has been moved to the third memory block, the memory controller is further arranged to discard all the backup data stored in the second memory blocks.

5. The data storage device of claim 1, wherein when the memory controller determines that no error has occurred in the data stored in the first memory block the memory controller is further arranged to discard all the backup data stored in the second memory blocks corresponding to the first memory block.

6. The data storage device of claim 1, wherein the memory controller comprises the buffer memory, when there is any error occurred in the data stored in the first memory block, the memory controller moves the backup data stored in the second memory blocks to the third memory block before updating content of a host-to-flash mapping table stored in the memory device based on content of the current flash-to-host mapping table stored in the buffer memory.

7. The data storage device of claim 1, wherein the memory controller comprises the buffer memory, when there is any error occurred in the data stored in the first memory block, the memory controller moves the backup data stored in the second memory blocks to the third memory block via a garbage collection procedure performed in background after updating content of a host-to-flash mapping table stored in the memory device based on content of the current flash-to-host mapping table stored in the buffer memory.

8. The data storage device of claim 1, wherein the memory device is a 3D NAND-type flash memory.

9. A data processing method for a data storage device comprising a memory device and a memory controller, wherein the memory device comprises a plurality of memory blocks and the memory controller is coupled to the memory device and arranged to access the memory device, the data processing method is performed by the memory controller and comprises:
configuring a first memory block as a data buffer to receive data from a host device;
configuring a plurality of second memory blocks as backup memory blocks corresponding to the first memory block, wherein the first memory block is a Triple-Level Cell (TLC) memory block and the second memory blocks are Single-Level Cell (SLC) memory blocks;
using the first memory block to receive the data and accordingly storing same data in the second memory blocks as backup data of the data stored in the first memory block, wherein only one of the first memory block and the second memory blocks has a current flash-to-host mapping table recorded in a buffer memory and mapping information of the other of the first memory block and the second memory blocks is not recorded in a mapping table, wherein the current flash-to-host mapping table comprises a plurality of fields, one field records physical-to-logical mapping information of one physical page of said one of the first memory block and the second memory blocks to indicate which logical page the data stored in said one physical page is directed to;

when the first memory block is full, determining whether any error has occurred in the data stored in the first memory block;

configuring a third memory block when determining that there is any error occurred in the data stored in the first memory block; and moving the backup data stored in the second memory blocks to the third memory block.

10. The data processing method of claim 9, further comprising:

discarding all the data stored in the first memory block when determining that there is any error occurred in the data stored in the first memory block.

11. The data processing method of claim 9, wherein the step of moving the backup data stored in the second memory blocks to the third memory block further comprises:

copying the backup data stored in the second memory blocks; and storing the copied backup data in the third memory block, wherein the third memory block is a TLC memory block.

12. The data processing method of claim 11, further comprising:

discarding all the backup data stored in the second memory blocks after the backup data stored in the second memory blocks has been moved to the third memory block.

13. The data processing method of claim 9, further comprising:

discarding all the backup data stored in the second memory blocks corresponding to the first memory block when determining that no error has occurred in the data stored in the first memory block.

14. The data processing method of claim 9, further comprising:

updating content of a host-to-flash mapping table stored in the memory device based on content of the current flash-to-host mapping table stored in the buffer memory, wherein the steps of configuring the third memory block and moving the backup data stored in the second memory blocks to the third memory block are performed in foreground before the memory controller updates the content of the host-to-flash mapping table stored in the memory device based on content of the current flash-to-host mapping table stored in the buffer memory.

15. The data processing method of claim 9, further comprising:

updating content of a host-to-flash mapping table stored in the memory device based on content of the current flash-to-host mapping table stored in the buffer memory, wherein the steps of configuring the third memory block and moving the backup data stored in the second memory blocks to the third memory block are performed via a garbage collection procedure performed in background after the memory controller has updated the content of the host-to-flash mapping table stored in the memory device based on content of the current flash-to-host mapping table stored in the buffer memory.

* * * * *